(12) United States Patent
Caplette

(10) Patent No.: US 7,341,023 B2
(45) Date of Patent: Mar. 11, 2008

(54) RODENT EUTHANASIA MACHINE

(76) Inventor: Joseph Raymond Caplette, 757 W. Nopal Cir., Mesa, AZ (US) 85210

( * ) Notice: Subject to any disclaimer, the term of this patent is extended or adjusted under 35 U.S.C. 154(b) by 195 days.

(21) Appl. No.: 10/908,173

(22) Filed: Apr. 29, 2005

(65) Prior Publication Data

US 2005/0178340 A1    Aug. 18, 2005

Related U.S. Application Data

(63) Continuation-in-part of application No. 10/772,669, filed on Feb. 5, 2004.

(60) Provisional application No. 60/444,872, filed on Feb. 5, 2003.

(51) Int. Cl.
*A01K 29/00* (2006.01)
*A61M 16/00* (2006.01)

(52) U.S. Cl. .................. 119/420; 128/203.12

(58) Field of Classification Search ........... 119/420, 119/418, 455; 128/203.12; 43/125
See application file for complete search history.

(56) References Cited

U.S. PATENT DOCUMENTS

| | | | | |
|---|---|---|---|---|
| 1,863,584 | A * | 6/1932 | Tracy | 43/129 |
| 4,336,590 | A * | 6/1982 | Jacq et al. | 128/204.21 |
| 4,343,304 | A * | 8/1982 | Hickmann | 128/200.14 |
| 4,365,590 | A * | 12/1982 | Ruggieri et al. | 119/418 |
| 4,699,088 | A * | 10/1987 | Murray et al. | 119/419 |
| 4,787,382 | A * | 11/1988 | Pekovic | 128/203.25 |
| 4,941,431 | A * | 7/1990 | Anderson et al. | 119/420 |
| 5,074,299 | A * | 12/1991 | Dietz | 128/204.21 |
| 5,220,882 | A * | 6/1993 | Jenkins | 119/420 |
| 6,352,076 | B1 * | 3/2002 | French | 128/203.12 |
| 6,776,158 | B1 * | 8/2004 | Anderson et al. | 128/203.12 |

* cited by examiner

*Primary Examiner*—Yvonne R. Abbott
(74) *Attorney, Agent, or Firm*—Lafkas Patent LLC; David M. Lafkas

(57) ABSTRACT

The present invention is an apparatus and method for euthanizing animals humanely and painlessly by introducing a gas at a first flow rate to cause the animals to reach narcosis. Then, the gas is introduced at an elevated second flow rate to induce a death to the animal that substantially meets or exceeds national and international standards for euthanasia.

11 Claims, 2 Drawing Sheets

RODENT EUTHANASIA MACHINE

CROSS-REFERENCE TO RELATED APPLICATIONS

This application for a patent is a continuation in part of U.S. patent application Ser. No. 10/772,669, which claims priority to U.S. Provisional Patent Application No. 60/444,872.

BACKGROUND

The subject of euthanasia in the biomedical research industry is not an easy one. Debates occur as to which are the preferred methods and reasons for euthanasia. Standards have been set by the American Veterinary Medical Association (AVMA) and the Canadian Council on Animal Care (CCAC) encompassing numerous points of consideration. Although most goals are met by the Research industry, a few of the goals are difficult to achieve. Such is the case with euthanizing small animals and rodents with carbon dioxide ($CO_2$).

Various methods for euthanizing animals are known in the art, including, for example, physical methods in the form of stunning, cervical dislocation, electrocution, pithing, decapitation, shooting, maceration, microwave radiation and exsanguinations. One may also use non-inhalant pharmacological agents, inhalant anesthetics or non-anesthetic gases.

In determining the type of euthanizing process to use, individuals are urged to consider the humaneness and pain involved in the process, despite the inevitable demise of the animal. As such, a set of criteria have been set forth to be used when determining what process of euthanasia to use. The criteria include: (1) ability to induce loss of consciousness and death without causing pain, distress, anxiety, or apprehension; (2) time required to induce loss of consciousness; (3) reliability; (4) safety of personnel; (5) irreversibility; (6) compatibility with requirement and purpose; (7) emotional effect on observers or operators; (8) compatibility with subsequent evaluation, examination, or use of tissue; (9) drug availability and human abuse potential; (10) compatibility with species, age, and health status; (11) ability to maintain equipment in proper working order; and (12) safety for predators and scavengers should the carcass be consumed.

When considering the twelve criteria, many experts find that on the whole, exposure of $CO_2$ gas to the animal is one of the more humane means euthanizing the animal. However, many research papers discussing this topic also identify a high level of distress that is prevalent with $CO_2$-related euthanasia. Tests have been conducted on animals and humans to better understand what these levels of distress are. Although disagreement among experts exists on the exact degrees of stresses involved, euthanasia involving $CO_2$ is still typically the preferred method for euthanizing small animals and rodents.

Carbon dioxide is preferred when euthanizing small animals and rodents because it is a relatively inexpensive gas that is colorless and odorless at low concentrations. Carbon dioxide is also considered to be quickly and readily taken into the body. Narcotic effects of $CO_2$ are well known, but most equipment for euthanization does not properly utilize these narcotic effects of $CO_2$ such that the euthanization can thereby be more humane and painless.

Presently, other euthanasia processes involving $CO_2$ as the only means of euthanization have $CO_2$ introduced at a single flow rate or at a single concentration. Such processes of introducing $CO_2$ to an animal to be euthanized at a single flow rate, at a single concentration, or both tend to dramatically increase the stresses upon the animal and thereby make its impending death less humane and more painful. For example, studies have shown that too low of concentration of $CO_2$ is considered a potent respiratory stimulant resulting in a tenfold increase in the ventilation rate and a feeling of profound respiratory distress.

What is desired, thus, is a means of euthanizing one or more animals using $CO_2$ gases but also substantially limiting the physical stresses that are placed upon the one or more animals when conventionally euthanizing with $CO_2$.

SUMMARY

The various exemplary embodiments of the present invention includes an apparatus for euthanizing one or more animals. The apparatus includes a holding cage having a cover and at least an inlet and at least one exhaust outlet. The holding cage is attached to one or more gas sources for holding a gas by way of at least a first flow meter. The first flow meter is connected to the one or more gas sources by way of one or more manifolds and one or more solenoids. The first flow meter regulates and introduces gas from the one or more gas sources into the holding cage at a first flow rate for a first predetermined flow period of time. The first flow meter, or a second flow meter, then regulates and introduces gas from the one or more gas sources into the holding cage at a second flow rate for a second predetermined flow period of time.

The various exemplary embodiments of the present invention further includes a method of euthanizing one or more animals. The method comprises placing the one or more animals into a holding cage, wherein the holding cage includes a cover for the holding cage. The holding cage further comprises at least an inlet and at least one exhaust outlet, wherein the holding cage is connected to one or more gas sources for holding a gas by way of at least a first flow meter. The first flow meter is connected to the one or more gas sources by way of one or more manifolds and one or more solenoids and the first flow meter regulates and introduces gas from the one or more gas sources into the holding cage at a first flow rate for a first predetermined flow period of time. The first flow meter, or a second flow meter, then regulates and introduces gas from the one or more gas sources into the holding cage at a second flow rate for a second predetermined flow period of time. After placing the one or more animals into the holding cage, a gas is introduced into the holding cage at the first flow rate until a narcotic set point for the one or more animals is achieved. Then the introduction of the gas at the first flow rate is ceased for a first wait period to ensure narcotic effects of the gas overtake the one or more animals. Then, the gas is introduced into the holding cage at the second flow rate until the gas accounts for approximately 100% of an internal atmosphere inside the holding cage. The introduction of the gas at the second flow rate is ceased for a second wait period to ensure irreversible euthanasia of the one or more animals. Finally, the euthanized one or more animals are removed from the holding cage and disposed of.

BRIEF DESCRIPTION OF THE DRAWINGS

Various exemplary embodiments of the present invention, which will become more apparent as the description proceeds, are described in the following detailed description in conjunction with the accompanying drawing, in which.

DETAILED DESCRIPTION

Figure 1:
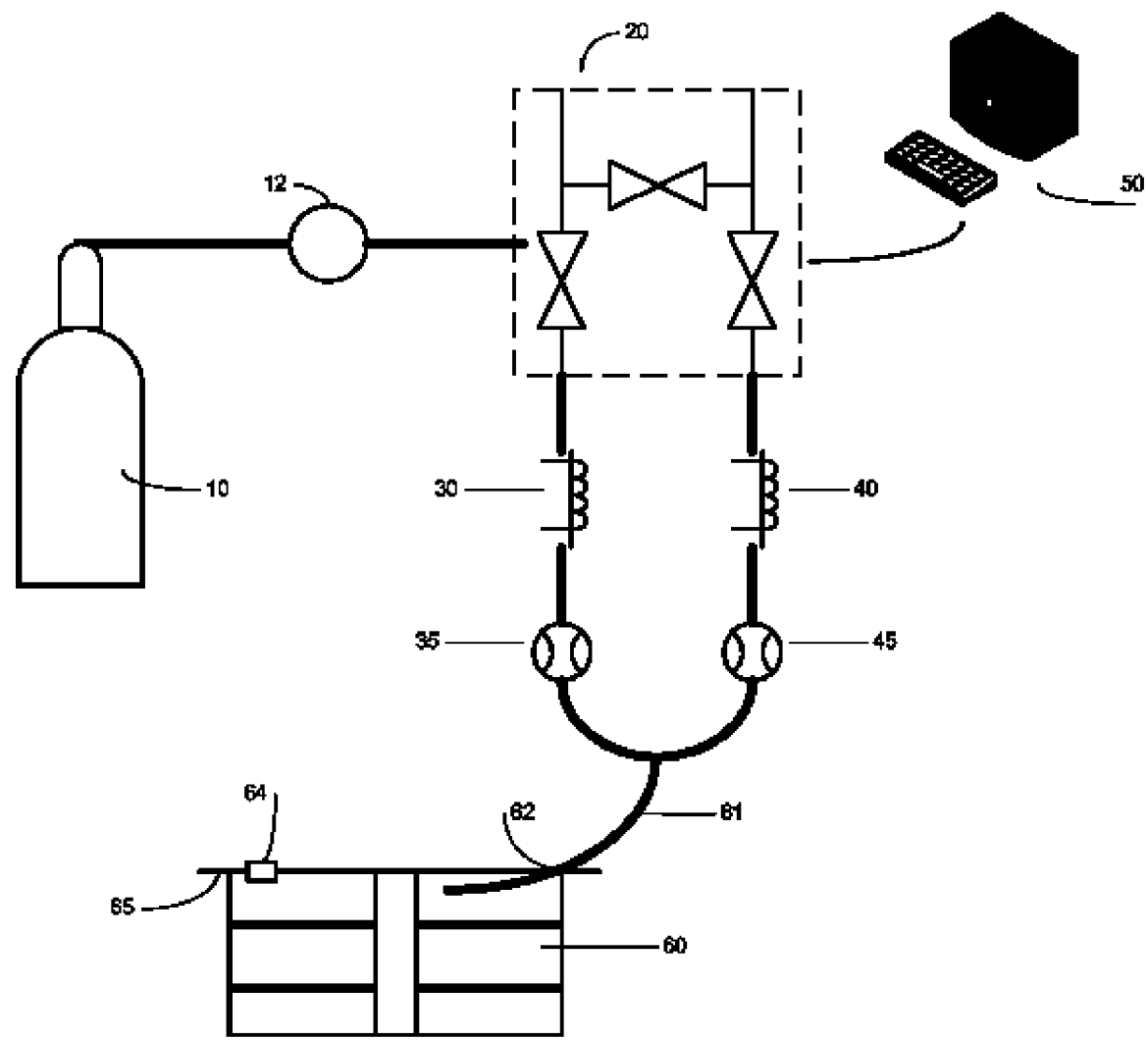
FIG. 1 is an illustrated representation of an exemplary embodiment of the present invention comprising a first flow meter and a second flow meter.

The various exemplary embodiments of the present invention include a method and an apparatus for humanely and substantially painlessly euthanizing one or more animals. The method and apparatus are preferably utilized in a laboratory or veterinarian's setting with personnel trained at euthanizing animals. These embodiments will become more apparent in the follow description and related FIGS. 1 and 2.

The exemplary embodiments of the present invention can be connected to cages of various sizes and constructions. In a preferred embodiment, the cage in which the one or more animals is euthanized is comprised of plastic, however, the cage 60 can also be of wire or mesh construction and then covered or sealed to ensure that the $CO_2$ introduced to the cage remains substantially in the cage.

No matter the composition of the cage material, a typical cage comprises a floor and four upstanding walls to form a generally rectangular surrounding. The cage may also comprise a top lid or cover 65 for enclosing the cage.

The present invention is designed to enable the laboratory personnel to efficiently and effectively attend to the destruction of the laboratory animals at the conclusion of the tests or experimental procedures. The method and apparatus of the present invention enables the animals to be destroyed painlessly and humanely without removing the animals from the cages in which the procedures were last performed. Thus, the animals need not be handled by the laboratory technicians. To this end, the apparatus of the present invention incorporates covers which fit on the cages, and a means to supply a gaseous medium to the cages in an efficient and effective manner. In particular, the apparatus incorporates a control means 50 which enables the introduction of the proper quantity of gaseous medium into the cages without need for highly skilled supervision of this procedure.

In the present invention, the covers 65 can be fit to various sizes of cages. The cover may include an inlet 62 through which one may introduce the gaseous medium. The cover may also comprise one or more exhaust outlets 64. However, each of the inlet and the one or more exhaust outlets can be located on the upstanding walls of the holding cage.

The various exemplary embodiments include at least one $CO_2$ gas source 10 such as, for example, one or more research or medical grade $CO_2$ pressurized containers 10. It is preferred that the $CO_2$ gas source have a pressure range of approximately 20 pounds per square inch (PSI) to approximately 150 PSI.

The $CO_2$ gas pressurized containers 10 are preferably connected to a regulator 12. In a preferred embodiment, the regulator regulates the $CO_2$ internal pressure at approximately 15 PSI.

Connected to the regulator 12 is a manifold 20 further connected to at least a first solenoid 30 and a second solenoid 40. The first solenoid 30 is then connected to a first flow meter 35 and the second solenoid 40 is connected to a second flow meter 45.

Although FIG. 1 is a graphic representation of an exemplary embodiment comprising a first flow meter and a second flow meter, it should be noted that a single flow meter may function in the role of both the represented first flow meter and second flow meter. In the embodiments comprising only a first flow meter, the first flow meter may be set to a first flow rate during a first predetermined flow period of time and to a second flow rate during a second predetermined flow period. Setting the first flow meter to more than one flow rate at different times can be performed manually or automatically via a controlling means, such as, for example, a computer.

Each flow meter is then connected to a respective bulkhead outlet which then can be inserted into the inlet 62 in the cover 65.

In a preferred embodiment, the first flow meter and the second flow meter are connected to a single bulkhead outlet 61 and then fed into the inlet, here present in the cover.

In the various exemplary embodiments, the first flow meter and the second flow meter may be set to different flow rates. Further, the first flow meter and the second flow meter may be turned on and off independently from the other.

The first flow meter and the second flow meter may be connected to a control means. The control means may be programmed to turn on the first flow meter and the second flow meter at one or more particular predetermined times, for a predetermined amount of time and at a predetermined flow rate of gas.

When the at least one of the first flow meter or the second flow meter of the present apparatus is turned on, $CO_2$ gas enters a cage via the inlet. The $CO_2$, being a gas heavier than oxygen ($O_2$) and nitrogen ($N_2$), the other two main chemicals in safe and breathable air, settles to the bottom part of the cage, that is, closer to the floor. As the $CO_2$ fills the bottom part of the cage, the safe and breathable air is displaced up and out the one or more exhaust outlets.

Normally, $CO_2$ is not a dangerous gas and typically comprises approximately 0.1% of breathable air. However, in high concentrations, the $CO_2$ can anaesthetize a mammal and eventually asphyxiate it.

Figure 2:
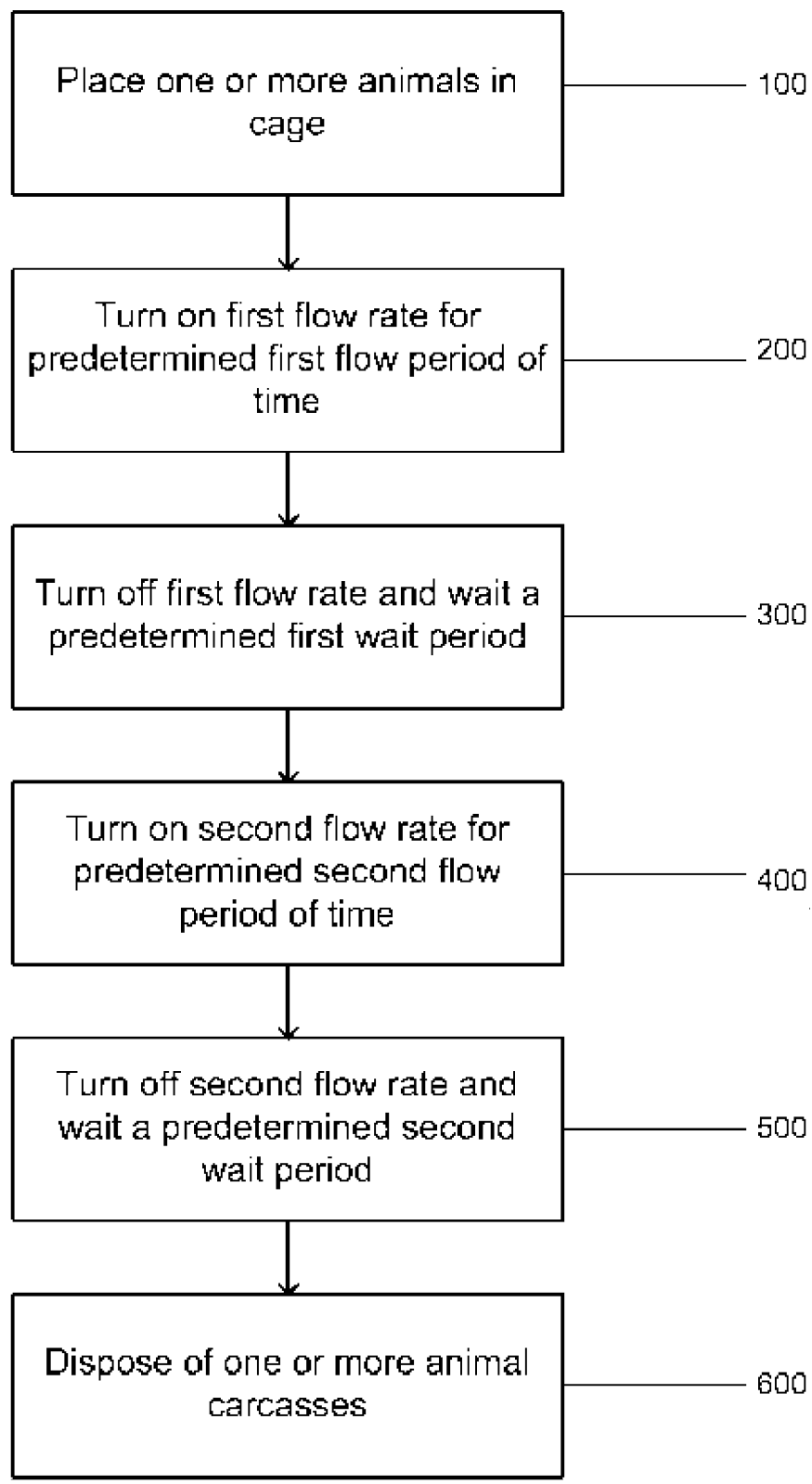
FIG. 2 is a flowchart of an exemplary embodiment of the present invention.

In the various exemplary embodiments of the present invention shown in FIG. 2, one or more animals are placed in a cage connected to the present apparatus, see step 100, and the first flow meter is first turned on for a predetermined period of time at a first flow rate to cause narcosis to the one or more animals. See step 200.

After the first flow meter is turned on for a predetermined first flow period of time, the flow meter is turned off and a predetermined first wait period occurs to better ensure that the narcosis, a narcotic setpoint, of the one or more animals sets in. See step 300.

Next, the second flow meter is turned on for a predetermined second flow period of time at a second flow rate until the $CO_2$ level in the cage is substantially about 100%. See step 400.

Finally, after the second flow meter is turned off, a second wait period occurs to ensure that nonreversible euthanasia of the one or more animals occurs. See step 500.

Once the one or more animals have been nonreversibly euthanized, the one or more animals' carcasses can be properly disposed of. See step 600.

By gradually overcoming the animals with $CO_2$ to the narcotic setpoint first, the animals do not thrash about and experience stresses often involved and observed when the animals are introduced to a much higher concentration of $CO_2$ all at once. Thus, the animals humanely and unknowingly are overcome by the $CO_2$, and then $CO_2$ concentration is greatly increased to ensure that the animals are not revived.

In an exemplary embodiment wherein the one or more animals are small rodents, such as for example, rats or mice, the small rodents are placed in the cage. The cage is covered with the cover 65 and the apparatus is connected to the cage via the inlet.

The first flow meter is turned on at approximately 2 liters per minute (LPM) for approximately 30 to approximately 35 seconds to achieve an approximately 20% $CO_2$ level in the cage. A first wait period of approximately 15 to approximately 20 seconds ensures that the small rodents are substantially overcome by $CO_2$-induced narcosis. The second flow meter is then turned on at approximately 8 LPM for approximately 60 seconds to ensure approximately 100% $CO_2$ in the cage. Then a second wait period of approximately 2 minutes in the 100% $CO_2$ atmosphere ensures irreversible euthanasia of the small rodents, the carcasses of which can then be disposed of.

Of course, the actual flow rates and times for introducing the $CO_2$ and wait periods can vary depending upon the size of the cage and the size, number and type of animal involved.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. An apparatus for euthanizing one or more animals, comprising:
   a holding cage comprising a cover, at least one inlet and at least one exhaust outlet;
   one or more gas sources for holding a gas; and
   one or more flow meters connected in parallel to the one or more gas sources by way of one or more manifolds and one or more solenoids, wherein the one or more flow meters introduce gas from the one or more gas sources into the holding cage at at least a first flow rate for a first predetermined flow period of time and at a second flow rate for a second predetermined flow period of time,
   wherein the first predetermined flow period of time and the second predetermined flow period of time do not occur simultaneously.

2. The apparatus according to claim 1, wherein the apparatus comprises a first flow meter and a second flow meter such that the first flow meter controls the first flow rate for the first predetermined flow period of time and the second flow meter controls the second flow rate at the second predetermined flow period of time.

3. The apparatus according to claim 1, wherein the one or more gas sources is a pressurized container.

4. The apparatus according to claim 1, wherein the gas is carbon dioxide ($CO_2$).

5. The apparatus according to claim 1, further comprising a controlling means for automatically setting and manipulating the first predetermined flow period of time, second predetermined flow period of time, the first flow rate and the second flow rate.

6. The apparatus according to claim 1, wherein the one or more animals are small rodents and the gas is $CO_2$.

7. The apparatus according to claim 6, wherein the one or more flow meters are turned on at the first flow rate of approximately 2 liters per minute for the first predetermined flow period of time of approximately 30 to approximately 35 seconds.

8. The apparatus according to claim 6, wherein an internal atmosphere of the holding cage is approximately 20% $CO_2$ after the one or more flow meters are turned on for the first predetermined flow period of time.

9. The apparatus according to claim 8, wherein a first wait period of approximately 15 to approximately 20 seconds occurs between the first predetermined flow period of time and the second predetermined flow period of time.

10. The apparatus according to claim 6, wherein the second flow rate is approximately 8 liters per minute for the second predetermined flow period of time of approximately 60 seconds.

11. The apparatus according to claim 10, wherein an internal atmosphere of the holding cage is approximately 100% $CO_2$ by an end of the second predetermined flow period of time.

* * * * *